Sept. 19, 1961     E. W. CARLSEN ET AL     3,000,162
PALLET BOX FILLER
Filed May 19, 1960     7 Sheets-Sheet 1

INVENTORS
EARL W. CARLSEN
HERMAN RYDER
ALVAN BAUM
BY
ATTORNEY

Sept. 19, 1961  E. W. CARLSEN ET AL  3,000,162
PALLET BOX FILLER

Filed May 19, 1960  7 Sheets-Sheet 2

FIG. 2.

INVENTORS
EARL W. CARLSEN
HERMAN RYDER
ALVAN BAUM

BY

ATTORNEY

Sept. 19, 1961 E. W. CARLSEN ET AL 3,000,162
PALLET BOX FILLER

Filed May 19, 1960 7 Sheets-Sheet 3

INVENTORS
EARL W. CARLSEN
HERMAN RYDER
ALVAN BAUM

BY
*J. A. Seegrist*
ATTORNEY

Sept. 19, 1961 E. W. CARLSEN ET AL 3,000,162
PALLET BOX FILLER
Filed May 19, 1960 7 Sheets-Sheet 4

INVENTORS
EARL W. CARLSEN
HERMAN RYDER
ALVAN BAUM
BY
ATTORNEY

Sept. 19, 1961  E. W. CARLSEN ET AL  3,000,162
PALLET BOX FILLER
Filed May 19, 1960  7 Sheets-Sheet 5

INVENTORS
EARL W. CARLSEN
HERMAN RYDER
ALVAN BAUM
BY
ATTORNEY

Sept. 19, 1961 E. W. CARLSEN ET AL 3,000,162
PALLET BOX FILLER
Filed May 19, 1960 7 Sheets-Sheet 6

INVENTORS
EARL W. CARLSEN
HERMAN RYDER
ALVAN BAUM

BY
*D. A. Seegrist*
ATTORNEY

Sept. 19, 1961  E. W. CARLSEN ET AL  3,000,162
PALLET BOX FILLER
Filed May 19, 1960  7 Sheets-Sheet 7

FIG. 14.

INVENTORS
EARL W. CARLSEN
HERMAN RYDER
ALVAN BAUM
BY
J. A. Seegrist
ATTORNEY

United States Patent Office 3,000,162
Patented Sept. 19, 1961

3,000,162
PALLET BOX FILLER
Earl W. Carlsen and Herman Ryder, Yakima, and Alvan Baum, Wapato, Wash., assignors to the United States of America as represented by the Secretary of Agriculture
Filed May 19, 1960, Ser. No. 30,392
7 Claims. (Cl. 53—248)

This invention relates to apparatus for filling pallet boxes with fresh fruit, especially apples, and has among its objects the provision of a filler which requires little manpower and handles the fruit with small bruising damage.

In a modern practice, apples are cold stored in wooden pallet boxes measuring about 4 feet by 4 feet and 30 in. deep, the sides of the pallet boxes being formed by spaced slats to allow free air circulation. It is preferred to grade, wash or otherwise treat the apples prior to cold storage. In this event it is convenient to transfer the apples by a belt conveyor from the treatment station to the pallet box filling station. The present filler is particularly designed to receive apples from the belt conveyor and load them into the pallet box.

For a detail description of the apparatus reference is made to the accompanying drawing in which.

Hoist 11 is mounted with an upward and downward movement on a stationary frame 12. A set of rollers 13 and 14 on the hoist engage opposite sides of a vertical flange 15 on the stationary frame. Similar rollers 16 and 17 and a flange 18 are laterally spaced from the first set. The rollers and flange guide the hoist in its movement, its lowermost position being limited by engaging stop 19 fixed to the frame 11.

The hoist is provided with a projecting overhead portion 20 which carries a downwardly projecting vertical central tubular shaft 21 with its lower end free, the shaft being rotatably mounted in bearings 22 and 23 fixed to the hoist. The shaft is rotated by means of an electric motor 24, through drive belt 25, gear box 26, gear box sprocket 27, chain 28, and sprocket 29 keyed to the shaft.

A pallet box 30 to be filled by the apparatus is rolled into position on roller rails 31 and 32 and is properly positioned relative to the filling apparatus by a guide rail 33.

The shaft carries several spaced, inclined fruit distributing baffles on its lower end portion rotatable horizontally with the shaft in the box as it is being filled.

Baffle 35 is provided with a metal core 36, well padded with resilient material such as polyurethane 37 held in place with a canvas covering 38. The baffle is supported by a ring 40 and a radial rod 41 swiveled in the ring, the inner end of the rod being pivotally mounted relative to the central shaft. One edge of the baffle is attached to the outer end portion of the rod thus to effect a pivoted mounting of the baffle on the shaft on a transverse axis along the upper edge portion of the baffle. The baffle slopes downwardly towards the edge portion opposite the mounting edge, the lower edge portion terminating in a flexible skirt having a trailing flexible tail 42 to aid in distribution of the fruit into the corners of the box. An upwardly extending flexible shield 43 is provided on the radial outer edge of the baffle to engage the sides of the box as the baffles rotate therein. This prevents the apples from being bruised by engaging the sides of the box. Six baffles are provided for the particular apparatus shown all of which, except for one, are generally similar to baffle 35 and its associated parts. Baffle 44 is, however, shaped differently at its lower edge portion which portion is sloped downwardly towards the center of the box as well as being inclined so as to cause some of the fruit to roll towards the box center thus providing a more level distribution of the fruit in the box.

As the baffles are horizontally rotated during filling of the box they are inclined and the fruit rolls down them and is deposited in an up-building layer in the box. It is necessary gradually to move the baffles upwardly as the box is being filled thus to maintain the incline of the baffles essentially constant. The upward movement is accomplished by power means, later more fully described, for lifting the hoist and its carried parts, the power means having an electric circuit (see FIG. 14) controlled by a normally open push button switch 45 closed by decrease in the incline of baffle 46, rod 47 of the baffle carrying a lever 48 to engage the switch button, and by a second similar switch 49 in series with switch 45 closed by decrease in the incline of baffle 40. Baffles 46 and 50 are spaced apart diametrically. The switches operate intermittently as the box is being filled thus imparting an intermittent upward movement of the baffles. Providing two switches in series controlled by spaced baffles prevents an upward movement of the hoist by a temporary decrease in the inclination of one of the baffles thus providing a more constant upward movement.

Means is provided for continuously feeding fresh fruit onto the rotating baffles. To this end a disc-shaped rotatable plate 53 is horizontally mounted relative to the central shaft concentric therewith above the baffles by means of three circumferentially spaced padded mounting brackets 54, 55, and 56. The plate slopes downwardly from its periphery towards a central opening 57 so that fresh fruit deposited on the plate rolls down the plate and out through the opening. An upwardly projecting flange 58 is provided around the periphery of the plate to prevent inadvertent spilling of fruit over the outer edge of the plate. A drape 59 in the form of flexible fringes hangs downwardly from the plate around the opening. The plate is covered with polyurethane padding 60 held in place with a canvas covering 61.

A rotatable, padded cone 67 is also mounted slidingly relative to the central shaft concentric therewith under the plate 53. A cone rests on ring 40 above the baffles within the drape with the smaller end of the cone upward, the cone being covered with polyurethane 68 held in place by canvas 69. Fruit from the opening in the plate falls down the inclined cone onto the baffles, the drape 59 acting to brake too rapid movement of the fruit.

The inclines on the plate and cone are selected to give a fairly rapid movement of the fruit down them without damage. A slope about 14° for the plate and 20° for the cone, with a shaft rotation of 8 to 12 r.p.m., has been found satisfactory.

With such slopes and a box of 30 inches depth, one plate and cone are not sufficient, since the drop from above the top of the box to its bottom is too great. Therefore, additional similar plates and cones in a series relationship are provided. With the particular apparatus illustrated there are two additional plates 70 and 71 with cones 72 and 73 and drapes 74 and 75 supported on the shaft.

Plate 70 is supported on the brackets 54, 55, and 56 welded to cone 72 which rests on a collar 76 locked to the central shaft 21. Plate 71 is supported on brackets 77, 78, and 79 welded to cone 73 which rests on a collar 80 locked to the central shaft.

When the box has been filled to the desired extent, means is provided for rapidly moving the hoist upwardly sufficiently for the baffles to clear the top of the box, the upward movement being limited by suitable means and the hoist being held in the upper position to allow for removing the filled box and place an empty box in filling position.

During the interval after the box is filled and just prior to commencement of filling the next box, means is provided for stopping feeding of the fruit onto the baffles. To accomplish this end the central shaft is tubular and an inner shaft 81 is vertically movably mounted therein. The baffles assembly is attached to the inner shaft at its lower end so as to move the baffles and cone with the shaft, so that as the inner shaft is moved upward the cone acts as a valve gate to close opening 57 sufficiently to prevent passage of the fruit therethrough.

For movement of the central shaft upward, it is provided with a radial flange 82 in form of a collar fixed near its upper end. A lever 83 is supported by pivot mounting 84 on the hoist. One end of the lever is provided with a yoke 85 and thrust ring 86 to engage under flange 82. The free end 87 of the lever engages against cross member 89 of the stationary frame, the arrangement being such that the end of the lever engages the cross member with the upward movement of the hoist at the time the box is filled. During the upward movement of the hoist to cause the baffles to clear the box, the thrust ring 86 of the lever engaging the flange on the inner shaft, lifts the shaft and also the cone 67 and the baffles.

While the cone is moving into position to close opening 57 there is a tendency for fruit rolling out of the opening to be trapped between the cone and the inner edge of the opening. To aid in dislodging such fruit, an outwardly projecting pin 90 on the inner shaft slides in an incilned slot 91 in the main shaft, thus to impart a rotary movement to the cone. Also heavy padding of the cone and the rim of the opening prevents damage of any fruit that may be trapped between these parts.

Figure 11:
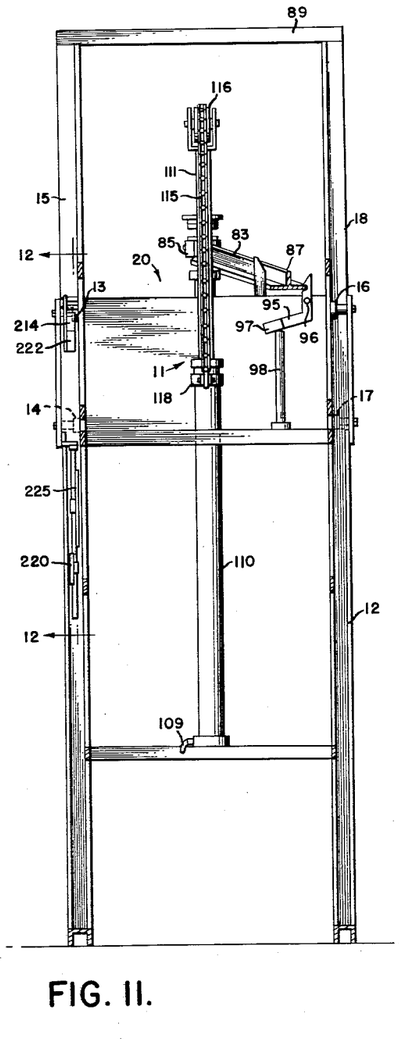
FIG. 11 is a section on line 11—11 of FIG. 1.
Figure 12:
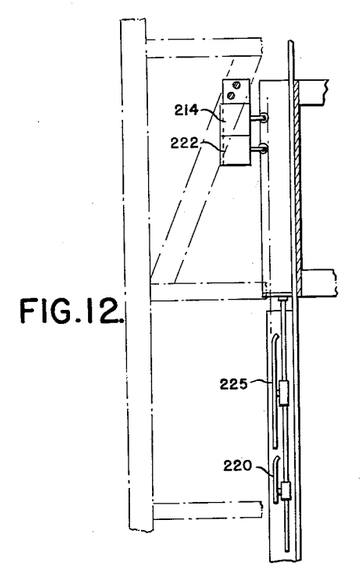
FIG. 12 is a section on line 12—12 of FIG. 11.

When the free end 87 of the lever has been depressed sufficiently for the cone 65 to close opening 61, a weighted catch 95 (see FIG. 11), which is attached to the hoist on pivot pin 96, engages the lever and holds it latched in position where it remains until the hoist is lowered to bring the baffles to the bottom of an empty box. At this lowered position tab 97 on the catch is brought into engagement with stop 98 mounted on the stationary frame thus to unlatch the catch from the lever. The weight of the inner shaft 81 and its carried parts will then cause the baffles and cone 67 to fall, thus to move the cone downwardly to open opening 57 and commence feeding of the fruit onto the baffles.

The hoist is power lifted by a hydraulic system, the oil for which is circulated by an electric motor 100 driving a hydraulic pump 101. Oil from supply tank 105 is fed to the pump through pipe 106 and is pumped through pipe 107 to a conventional type rotary control valve 108. In one setting of the valve, the oil is forced from the valve through pipe 109 to the lower closed end of hydraulic cylinder 110 fixedly mounted on frame 12 to impart an upward lift to the ram 111 which is operatively connected to the hoist 11. With valve 108 in the opposite setting, oil from the hydraulic cylinder is forced by the weight of the hoist and its carried parts through pipe 109, valve 108 and pipe 112 to the oil supply tank. In the neutral setting of valve, the oil is locked in the hydraulic cylinder thus to hold the hoist stationary. During both the neutral setting of the valve and its setting to lower the hoist, oil from the pump circulates freely through pipe 107, the valve and pipe 112 to the supply tank, motor 100 running continuously.

The connection of the ram to the hoist is made through a hoist chain 115 threaded over a sprocket 116 rotatably attached to the upper end of the ram 111. One end of the chain is fixed to a bracket 118 attached to the hydraulic cylinder and the other end is fixed to the cross member 119 of the hoist. This arrangement doubles the movement of the hoist relative to movement of the ram.

The setting of valve 108 is controlled by electric solenoids 125 and 126. Activation of solenoid 125 sets the valve to allow downward movement of the hoist and activation of solenoid 126 sets it for upward movement. With neither solenoid activated the valve is in its neutral setting.

Figure 13:
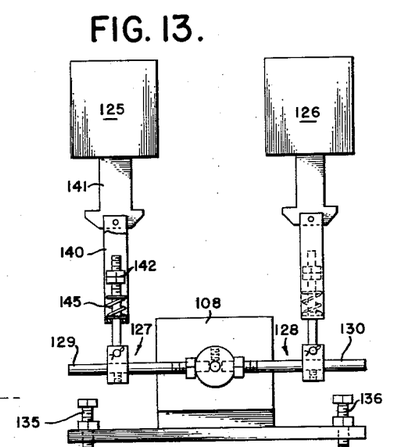
FIG. 13 illustrates a detail.

The solenoids are connected to the valve by linkages 127 and 128 through arms 129 and 130 respectively. In order to adjust the upward and downward speed of the moving hoist, adjustable stops 135 and 136 (see FIG. 13) are provided to limit the extent of movement of arms 129 and 130, the greater opening of the valve in either direction providing for more rapid flow of the oil and increased speed. The solenoids are allowed full movement however, because of the types of linkages 127 and 128. To this end each link is provided with a yoke such as illustrated at 140 connected to its solenoid core 141 and a bolt 142 swivelly connected to its arm 129. The bolt and yoke are slidably connected together as illustrated, a spring 145 being interposed to cushion the shock of the moving solenoid core. The linkage for solenoid 126 is similar.

Figure 14:
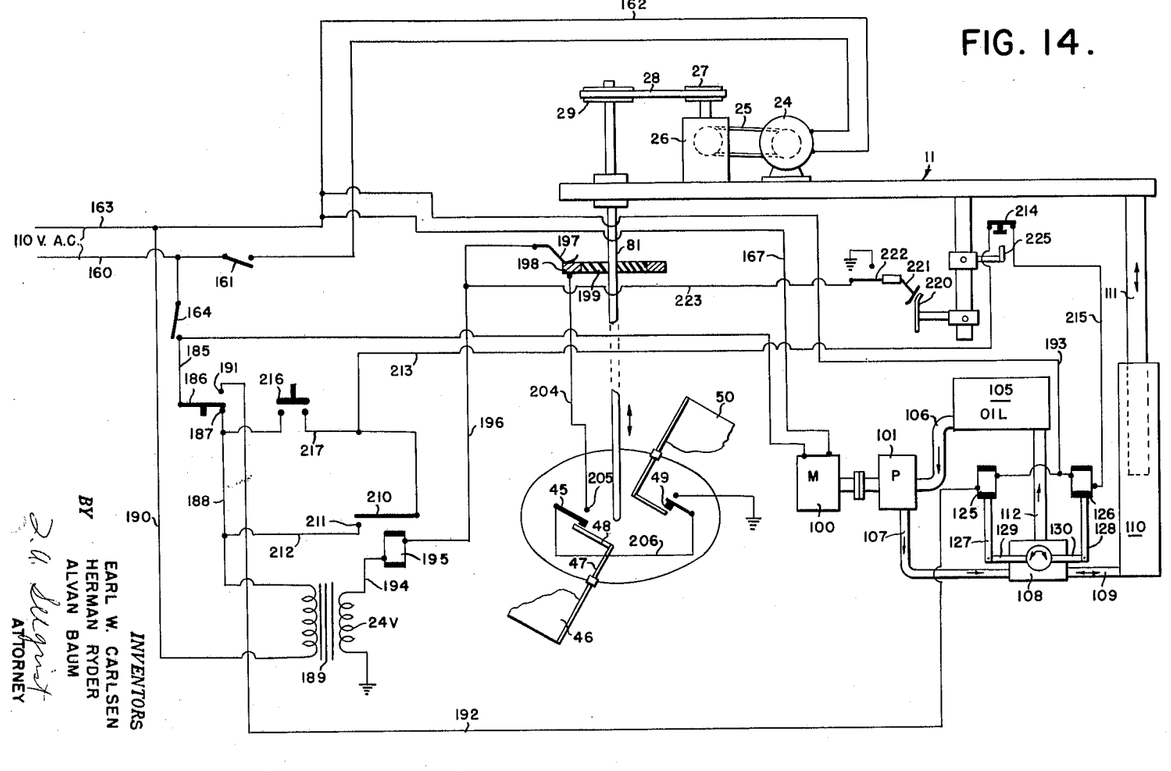
FIG. 14 is a schematic diagram of the electrical and hydraulic circuits of the filler.

The more detailed operation of the filler is best understood by reference to FIG. 14. Current is supplied to the motor 24 from a usual 110 A.C. source through the hot lead 160 and hand control switch 161, the return conductor 162 from the motor connecting to the neutral lead 163 of the source. Current is supplied to the motor 100 from lead 160 and hand control switch 164, the return conductor 167 being connected to neutral lead 163.

Current is also supplied for automatic operation of the hydraulic system through switch 164. From switch 164 through conductor 185 current is supplied through the 2-way push button switch 186, normally closed to contact 187, through conductor 188, through the primary of transformer 189 and back to the neutral lead 163 through conductor 190. Thus in the normal position of switch 186, solenoid 125 is active. To cause downward movement of the ram 111, switch 186 is hand pushed to close it to contact 191, and open it from contact 187, the current being supplied through conductor 192, through solenoid 125, through conductors 193 and 162 to the neutral lead 163.

Assume that switches 161 and 164 are closed with the rotor assembly in its lower position and the baffles are rotating to distribute the fruit in the box. In this state, switch 186 is in its normal position and both solenoids 125 and 126 are inactive. However, current is being supplied to the primary of transformer 189 and motor 100 is operating.

Figures 1, 15:
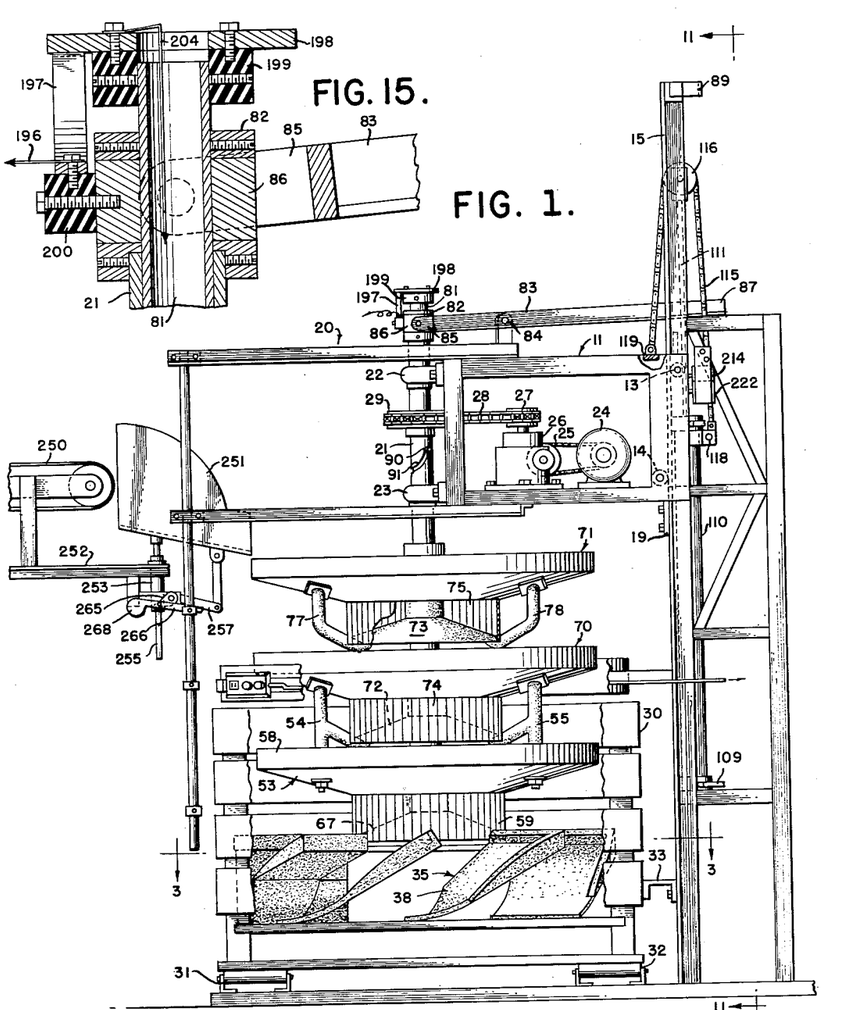
FIG. 1 is a side elevation of the filler with parts broken away and parts, particularly the electric circuit and hydraulic circuit, removed for illustration purposes.
FIG. 15 is a section in the plane of the paper of a detail enlarged over the showing in FIG. 1.
Figure 2:
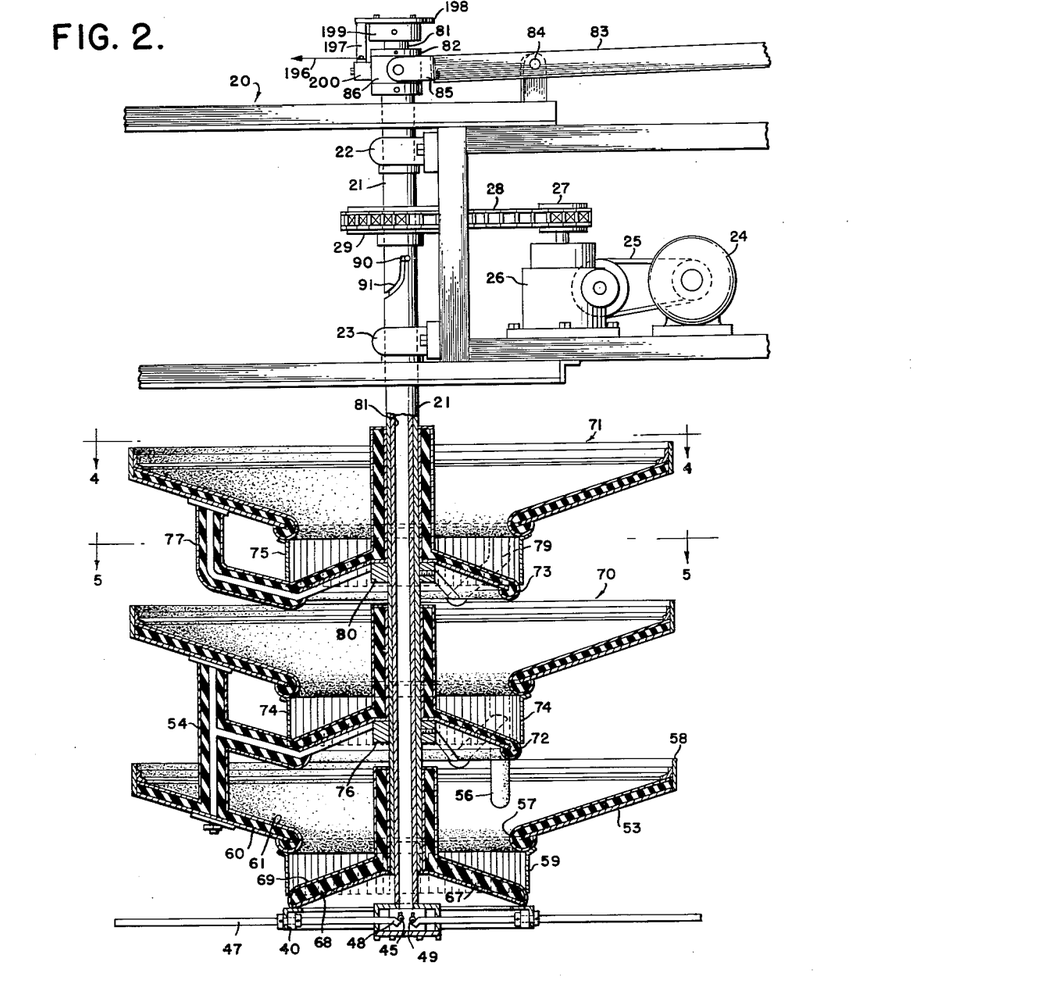
FIG. 2 is an enlarged detail of a side elevation of the filler corresponding in FIG. 1, parts being shown in section in the plane of the paper.
Figure 3:
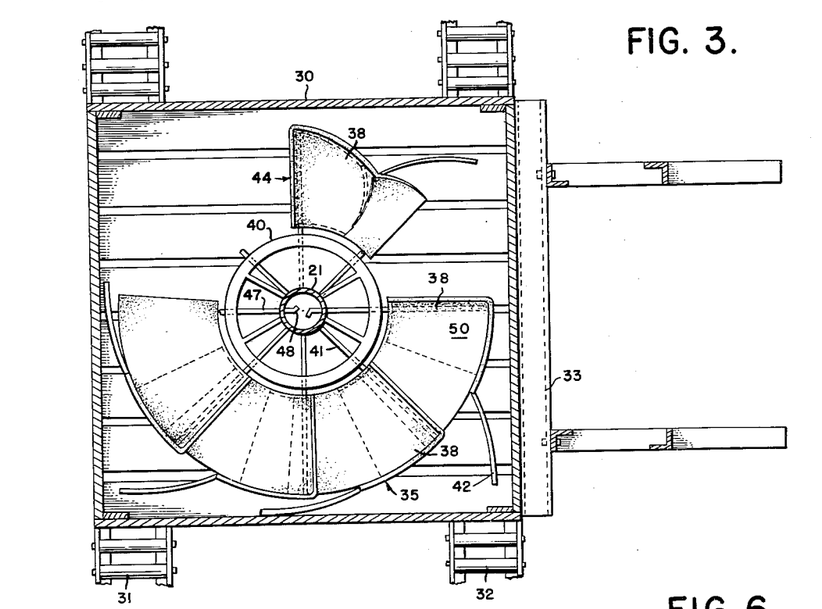
FIG. 3 is a section on line 3—3 of FIG. 1 with some parts removed.
Figure 4:
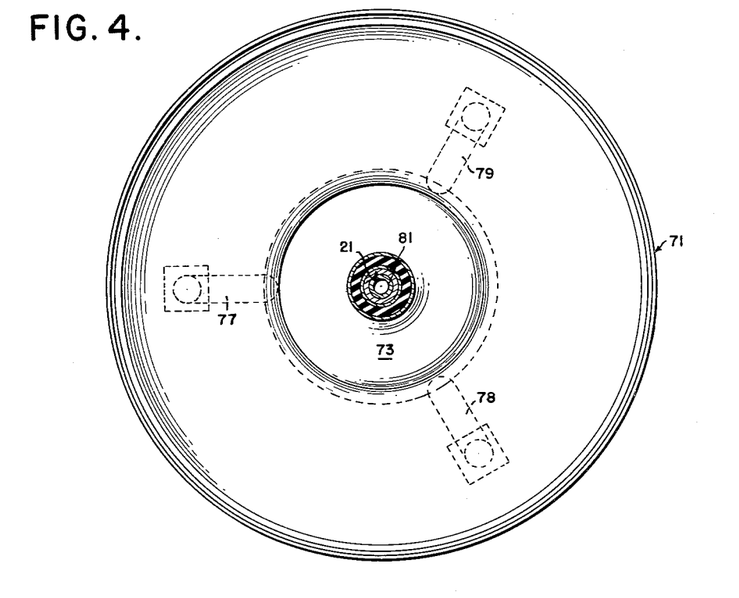
FIG. 4 is a section on line 4—4 of FIG. 2.
Figure 5:
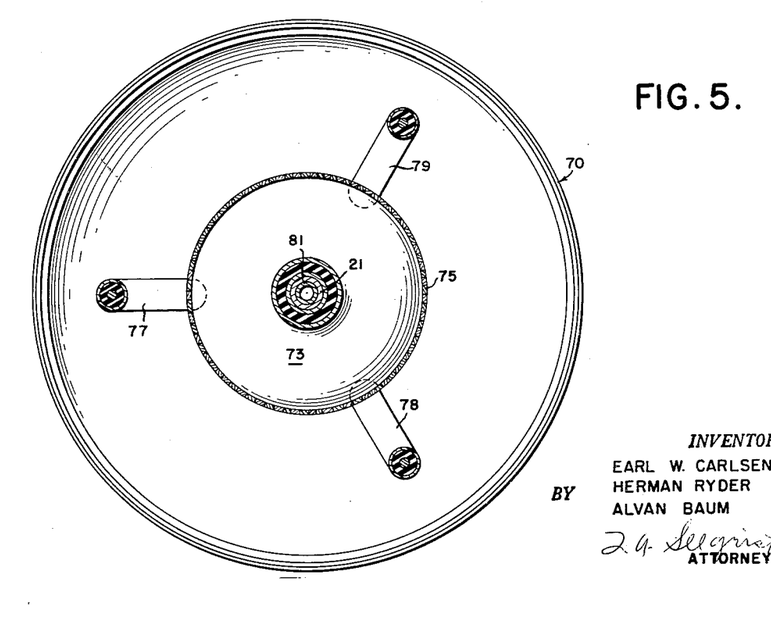
FIG. 5 is a section on line 5—5 of FIG. 2.
Figure 6:
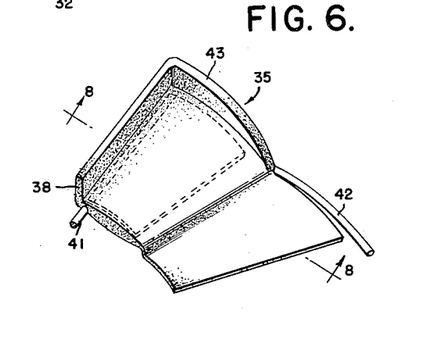
FIG. 6 illustrates a detail.
Figure 7:
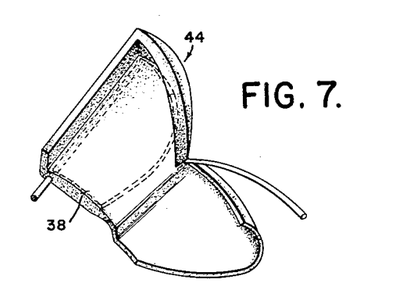
FIG. 7 illustrates a detail.
Figure 8:
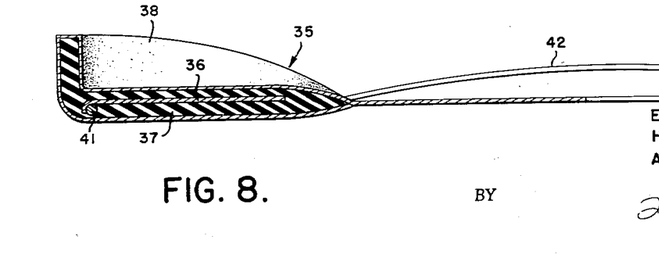
FIG. 8 is a section on line 8—8 of FIG. 6.
Figure 9:
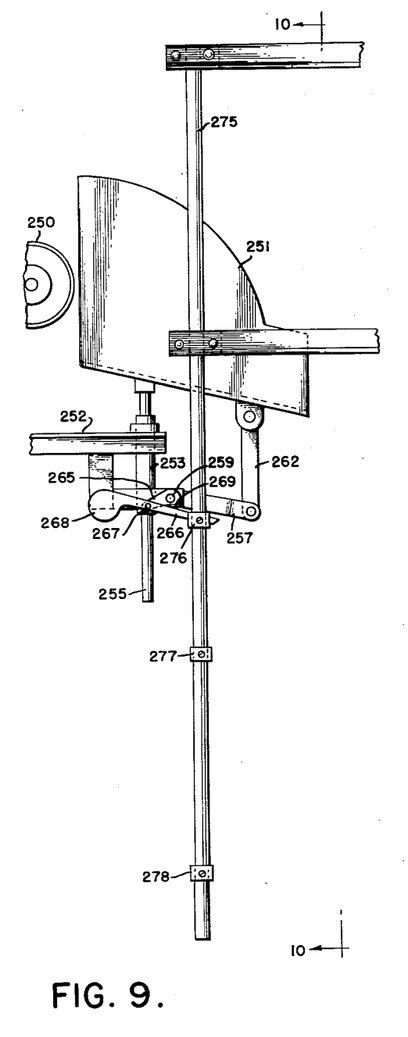
FIG. 9 is an enlarged detail of a side elevation of the filler corresponding to FIG. 1.
Figure 10:
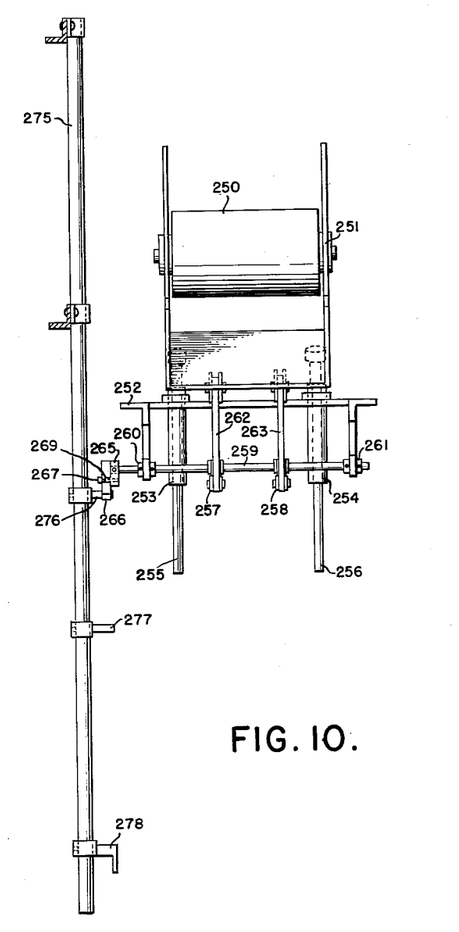
FIG. 10 is a section on line 10—10 of FIG. 9.

The 24-volt secondary of the transformer 189 has one terminal grounded to the frame, the other terminal being connected through conductor 194 to one terminal of coil 195 of a relay, the other terminal being connected through conductor 196 to contact 197 engaging a slip ring 198 attached to shaft 81 through insulator 199 to rotate with the shaft. The contact 197 is mounted on insulator 200 which is attached to the thrust ring 86 (see FIG. 15).

When the pallet box partially fills and the baffles reduce their incline the two baffles 46 and 50 of the rotor assembly close the two normally open push button switches 45 and 49, respectively. Slip ring 198 is permanently connected through conductor 204 to terminal 205 of switch 45 the switch being connected in series with switch 49 through conductor 206. When switches 45 and 49 close to connect the slip ring to ground, the circuit through coil 195 of the relay is completed. The normally open switch 210 of the relay then closes to contact 211 and the 110-volt circuit from switch 186 is supplied through conductors 188, 212 and 213 through normally closed push button switch 214, through conductor 215, through solenoid 126 and through conductor 193 to the neutral lead 163. This current sets valve 108 to supply oil to cylinder 110 causing upward movement of the hoist until the baffles 46 and 50 are again sufficiently inclined to break contact of either of switches 45 and 49. Thus the rotor assembly automatically moves upwardly intermittently as the box is filled.

If at any time the operator desires manually to move the rotor assembly upwardly he can do so by closing the normally open press button switch 216 thus supplying the 110-volt current directly from contact 187 through conductor 217 to conductor 193.

When the box is filled to the desired level, a switch actuator blade 220 carried by the hoist but vertically adjustable thereon engages a control lever 221 to close the normally open leveling height switch 222 attached to the stationary frame thus to ground conductor 223 connected through conductor 196 to coil 195. This activates the coil and closes relay switch 210, irrespective of the position of baffles 46 and 50. The hoist then moves upwardly without halting.

The hoist is limited in its upward movement by opening of the normally closed limit switch 214 attached to the stationary frame thus to deactivate solenoid 126. Switch 214 is opened by switch actuator 225 carried by the hoist but adjustable in position thereon.

For a full explanation of the operation of the apparatus, assume it is not running and the baffles are at the highest position. The operator places an empty box in position under the baffles, closes switch 161 to cause rotation of the baffles, and closes switch 164 to put the hydraulic pump 101 into operation and to excite the primary of transformer 189. He then pushes switch 186 to close it to contact 191 thus to energize solenoid 125 and set the valve 108 to lower the baffles to their lowermost position in the box.

He then starts the feeding of fruit from the belt conveyor into the uppermost plate 71. The fruit rolls down plate 71 through its central opening, down cone 73 onto plate 70, through its central opening, down cone 72 onto plate 53, through its central opening and finally down cone 67 onto the baffles. As the box fills, switches 45 and 49 close intermittently to energize solenoid 126 and gradually raise the baffles. Such operation continues until the box is filled to the desired level, as determined by the height adjustment of switch actuator blade 220. At this stage actuator blade 220 engages the control lever 221 of switch 222 and closes the switch thus to continuously excite solenoid 126 and raise the baffles to their position to clear the top of the box. During this movement of the baffles, cone 67 is moved upward to close the central opening 57 of plate 53 and stop feeding of the fruit onto the baffles, the fruit collecting on plate 53 during the time required to start feeding into the next empty box. At the uppermost position of the baffles, as determined by the height adjustment of switch actuator blade 225, switch 214 is opened thus to de-energize solenoid 126. At this stage valve 108 sets in its neutral position and the baffles are held in the uppermost position. The operator then removes the filled box, places an empty box in position to be filled, and repeats the cycle. Thus, except for the manual changing of the boxes and the hand control of switch 186 to lower the baffles into an empty box, the filling operation is essentially automatic.

The fruit is delivered to the pallet box filler by a belt conveyor 250. A chute mechanism deposits the fruit onto a selected one of the plates 53, 70, or 71 depending on the vertical position of the plates. To accomplish this purpose a vertically movable chute 251 is placed between the delivery end of conveyor 250 and the plates, the delivery end of the chute being near the periphery of the plates and curved to their shape.

Stationary chute frame 252 has secured thereto guides 253 and 254 which slidingly receive rods 255 and 256 fastened to the bottom of the chute. Levers 257 and 258 are pivotally mounted by pin 259 riding in bearings 260 and 261 carried by the frame. Links 262 and 263 connect the free ends of the levers to the chute.

The end of pin 259 has secured thereto a chute lifting arm 265. Lever 266 is mounted on arm 265 by a pivot 267 and is weighed with mass 268 so as to normally assume a position with the lever engaged against a stop 269 on the chute lifting arm.

The hoist carries a depending shaft 275 on which three projecting tabs 276, 277, and 278 are adjustably mounted, the tabs being positioned selectively to engage lever 266 as the hoist raises.

Assume the baffles to be in the lowermost position in the box being filled. Chute 251 will then be in position to feed into the upper plate 71 and tab 276 will be adjusted on shaft 275 to be commencing its engagement with lever 266. As the tab rises, it raises lever 266 which, due to engagement with stop 269, rotates the chute lifting arm 265, thus to raise the chute by means of pin 259, levers 257 and 258 and links 262 and 263, the mechanism being proportioned to give the same rate of upward movement to the chute as that of the hoist. When the hoist has risen sufficiently to bring the next lower plate 70 into proper position above the box, lever 266 will be raised sufficiently to permit tab 276 to by-pass it, whereupon the chute, due to its weight, will quickly fall back to its original position, proper for feeding into the next lower plate 70, and tab 277 will be adjusted to commence its engagement with lever 266. The cycle will then recur relative to plate 70 and the lowermost plate 53.

The lowermost tab 278 is however designed as shown so that it will not by-pass lever 266, but will maintain the chute in position for feeding into plate 53 during the uppermost position of the hoist and while a filled box is being replaced with an empty.

While the baffles are being lowered into an empty box, tabs 276 and 277 will ride downward and engage reversely against lever 266 which, due to its pivoted mounting at 267, is free to reversely rotate and permit the tabs to pass it, mass 268 by gravity returning the lever to its normal position.

During the intervals of changing boxes or during movement of the plates past the chute, as for example while the baffles are being lowered into an empty box, feeding of the fruit onto the chute may be suspended by any desired means. For example, a conveyor motor switch may be arranged to be operated by position of the hoist, the switch being opened by approach of the hoist closely to its uppermost position, and being closed by approach of the hoist closely to its lowermost position.

We claim:

1. An apparatus for filling a box with fresh fruit comprising a frame, a vertical shaft having a free lower end rotatably carried by the frame, an inclined baffle carried by the lower end portion of the shaft to one side thereof so that the baffle rotates horizontally with the shaft, the baffle being pivotally mounted to the shaft on a transverse axis along the upper edge portion of the baffle with the opposite edge portion of the baffle free, means for continuously feeding fresh fruit onto the upper portion of the baffle as it rotates such that, when a box being filled is in position with the rotating baffle therein the baffle is positioned with its free edge portion riding over the layer of fruit in the box and the fruit being fed onto the baffle rolls down it, and means for gradually moving the baffle upwardly as the box is being filled so as to maintain the incline of the baffle essentially constant, said baffle being padded and provided with an upwardly extending, flexible shield along its radial outer edge portion to engage the box sides as the box is being filled, thus to prevent bruising of the apples as they roll down the baffle and prevent them from being bruised by contact with the sides.

2. Apparatus for filling a box with fresh fruit comprising a stationary frame, a hoist mounted with upward and downward movement on the stationary frame, a vertical shaft having a free lower end rotatably carried by the hoist, an inclined baffle carried by the lower end portion of the shaft to one side thereof so that the baffle rotates horizontally with the shaft, the baffle being pivotally mounted to the shaft on a transverse axis along the upper edge portion of the baffle with the opposite edge portion of the baffle free, means for continuously feeding fresh fruit onto the upper portion of the baffle as it rotates, such that, when a box being filled is in position with the rotating baffle therein the baffle is positioned with its free edge portion riding over the layer of fruit in the box and the fruit being fed onto the baffle rolls down it, and means for gradually moving the hoist and its carried parts upwardly as the box is being filled so as to maintain the incline of the baffle essentially constant, said apparatus being characterized in that the means for gradually moving the hoist and its carried parts upwardly includes an electric circuit and a switch for controlling the circuit, the switch being operated by pivoting of the baffle, whereby as the box is being filled and the baffle decreases its incline the switch is operated to raise the baffle a short distance thus increasing its incline and operating the switch to stop upward movement of the baffle, the switch operating intermittently as the box fills.

3. An apparatus for filling a box with fresh fruit comprising a frame, a vertical shaft having a free lower end rotatably carried by the frame, a plurality of inclined baffles each carried by the lower end portion of the shaft to one side thereof so that the baffles are spaced apart and rotate horizontally with the shaft, each baffle being pivotally mounted to the shaft on a transverse axis along the upper edge portion of the baffle with the opposite edge portion of the baffle free, means for continuously feeding fresh fruit onto the upper portion of the baffles as they rotate such that, when a box being filled is in position with the rotating baffles therein the baffles are positioned with their free edge portions riding over the layer of fruit in the box and the fruit being fed onto the baffles rolls down them, and means for gradually moving the baffles upwardly as the box is being filled so as to maintain the incline of the baffles essentially constant, said apparatus being characterized in that the means for gradually moving the baffles upwardly includes an electric circuit controlled by two switches in series, one switch being operated by pivoting of one baffle and the other switch being operated by the pivoting of another baffle, whereby as the box is being filled and the baffles decrease their incline the switches are operated to raise the baffles a short distance increasing their incline and operating the switches to stop upward movement of the baffles, the switches operating intermittently as the box fills and the switches, due to their series connection, preventing upward movement of the baffles by a temporary decrease in the inclination of one of them.

4. The apparatus of claim 3 comprising also means effective when the box is filled for moving the baffles upwardly a distance sufficient to clear the top of the box so that the filled box may be removed and an empty box placed in filling position, means for limiting the upward movement of the baffles, means for holding them in their upper position while the boxes are changed, and means for stopping feeding of the fresh fruit onto the baffles after the box is filled and prior to commencing filling of the empty box.

5. An apparatus for filling a box with fresh fruit comprising a frame, a vertical shaft having a free lower end rotatably carried by the frame, a plurality of inclined baffles each carried by the lower end portion of the shaft to one side thereof so that the baffles are spaced apart and rotate horizontally with the shaft, each baffle being pivotally mounted to the shaft on a transverse axis along the upper edge portion of the baffle with the opposite edge portion of the baffle free, means for continuously feeding fresh fruit onto the upper portion of the baffles as they rotate such that, when a box being filled is in position with the rotating baffles therein the baffles are positioned with their free edge portions riding over the layer of fruit in the box and the fruit being fed onto the baffles rolls down them, and means for gradually moving the baffles upwardly as the box is being filled so as to maintain the incline of the baffles essentially constant, said apparatus being characterized in that the means for continuously feeding the fresh fruit onto the baffles comprises at least one disc-shaped, rotatable padded plate horizontally mounted above the baffles concentric with the shaft and having a central opening, the plate being sloped downward from its periphery towards the open central portion, whereby fresh fruit fed onto the plate rolls downwardly through the opening and onto the baffles.

6. The apparatus of claim 5 characterized in that the feeding means comprises in addition a rotatable, padded cone mounted under the plate and above the baffles concentric with the shaft with the smaller end of the cone upward, whereby the fruit rolls through the opening onto the cone and then onto the baffles.

7. An apparatus for filling a box with fresh fruit comprising a frame, a vertical shaft having a free lower end rotatably carried by the frame, a plurality of inclined baffles each carried by the lower end portion of the shaft to one side thereof so that the baffles are spaced apart and rotate horizontally with the shaft, each baffle being pivotally mounted to the shaft on a transverse axis along the upper edge portion of the baffle with the opposite edge portion of the baffle free, a disc-shaped, rotatable padded plate horizontally mounted above the baffles concentric with the shaft and having a central opening, the plate being sloped downwardly from its periphery towards the central opening whereby fruit fed onto the plate rolls downwardly through the opening, a rotatable, padded cone mounted under the plate and above the baffles concentric with the shaft with the smaller end of the cone upward, whereby fruit rolling through the opening rolls onto the cone and then onto the upper portion of the baffles as they rotate such that, when a box being filled is in position with the rotating baffles therein the baffles are positioned with their free edge portions riding over the layer of fruit in the box and the fruit being fed onto the baffles rolls down them, means for gradually moving the baffles upwardly as the box is being filled so as to maintain the incline of the baffles essentially constant, means effective when the box is filled for moving the baffles upwardly a distance sufficient to clear the top of the box so that the filled box may be removed and an empty box placed in filling position, means for limiting the upward movement of the baffles, means for holding them in their upper position while the boxes are being changed, said cone being slidably mounted relative to the vertical shaft, means for moving the cone upwardly to act as a valve gate to close the opening sufficiently to prevent passage of fruit therethrough while the boxes are being changed and while the baffles are lowered to the bottom of the empty box, and means for moving the cone downwardly when the baffles are lowered to the bottom of the empty box, thus to open the opening and commence feeding of the fruit onto the baffles.

References Cited in the file of this patent

UNITED STATES PATENTS

| | | |
|---|---|---|
| 1,886,295 | Morris | Nov. 1, 1932 |
| 1,936,341 | Swanson | Nov. 21, 1933 |
| 1,987,916 | Thompson | Jan. 15, 1935 |
| 2,348,056 | Cheely et al. | May 2, 1944 |
| 2,766,782 | Bell et al. | Oct. 16, 1956 |
| 2,896,384 | Carlsen et al. | July 28, 1959 |